United States Patent [19]

Farmer

[11] 4,241,035
[45] Dec. 23, 1980

[54] SYNTHETIC IMOGOLITE

[75] Inventor: Victor C. Farmer, Aberdeen, Scotland

[73] Assignee: National Research Development Corporation, London, England

[21] Appl. No.: 54,650

[22] Filed: Jul. 3, 1979

[30] Foreign Application Priority Data

Jul. 7, 1978 [GB] United Kingdom ............... 29132/78

[51] Int. Cl.$^3$ ............................................. C01B 33/26
[52] U.S. Cl. .................................. 423/327; 252/455 R; 423/329
[58] Field of Search ................................ 423/327–330; 252/317, 453, 455 R

[56] References Cited

U.S. PATENT DOCUMENTS

| | | | |
|---|---|---|---|
| 2,844,523 | 7/1958 | Veltman et al. | 252/453 X |
| 3,252,917 | 5/1966 | Mindick et al. | 252/455 R |
| 4,152,404 | 5/1979 | Farmer | 423/328 |

FOREIGN PATENT DOCUMENTS

953605  8/1974  Canada ...................................... 423/327

OTHER PUBLICATIONS

Wada, "The American Mineralogist", vol. 54, 1969, pp. 50–71.

*Primary Examiner*—Edward J. Meros
*Attorney, Agent, or Firm*—Oblon, Fisher, Spivak, McClelland & Maier

[57] ABSTRACT

An inorganic material akin to imogolite is synthesized. Imogolite is a natural product having tubular structure and occurs in some soils. The synthetic product has tubes of 13–17% greater diameter, and is made thus:

Prepare an aqueous hydroxyaluminium silicate solution containing up to 0.5 molar aluminium and of pH 3.1 to 5.0 by acid-hydrolyzing aluminium alkoxides and (introduced not earlier than the alkoxide) tetraalkyl silicate. The atomic proportion of Si: Al is up to 0.6:1.

The solution thus prepared is digested, say at 96° C. for a day, until a product is obtained displaying discernible electron diffraction peaks at 1.4 Å, 2.1 Å and 4.2 Å.

21 Claims, 1 Drawing Figure

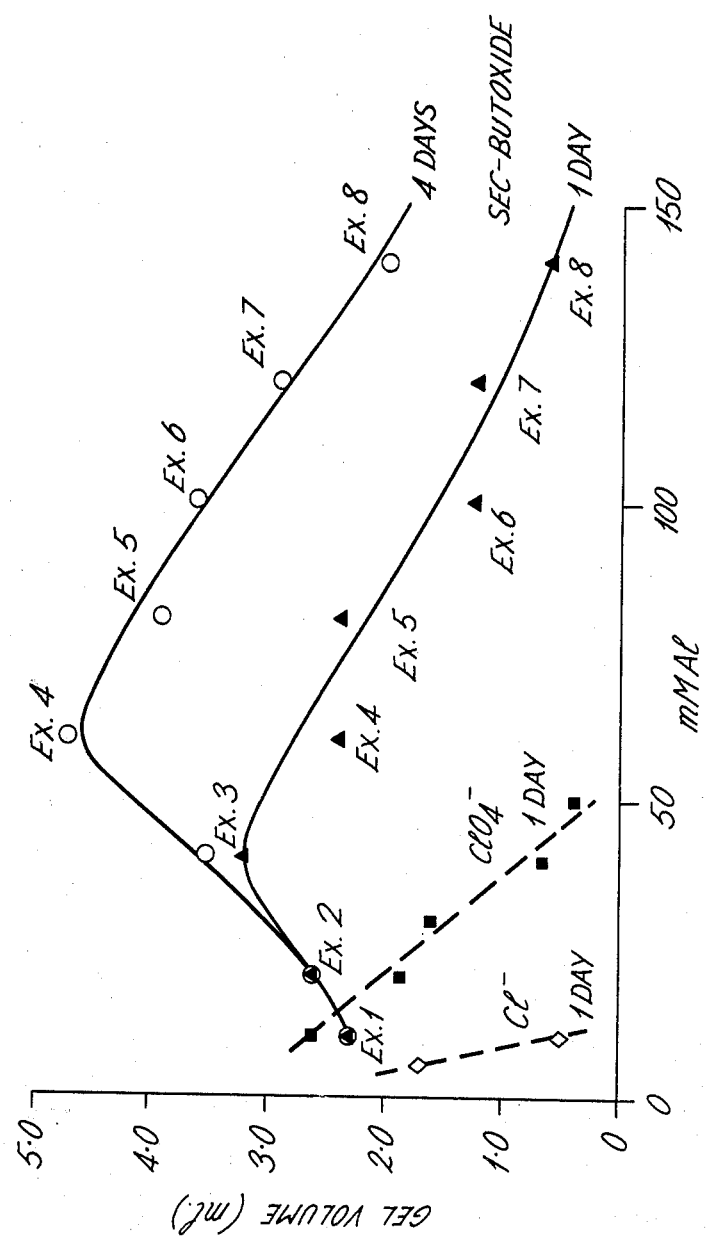

SYNTHETIC IMOGOLITE

This invention relates to an inorganic material, which is a fibrous product having tubular structure related to, or resembling, the natural product imogolite. This invention is related to that described in our U.K. Patent Application No. 12957/77.

Imogolite is a regular polymeric hydrated aluminium silicate which is found principally in weathered volcanic deposits, often in the form of thin gelatinous films, and consists of long tubes (for example 1 to 10 micrometers) with an outside diameter of around 22 Å and inside diameter about 10 Å. The tubes are partially aligned in bundles giving a highly porous material (pore space around 60%) with pores of effectively about 9 Å diameter, affording a surface area of about 1000 m$^2$g$^{-1}$, containing in the natural state from 10 to 45 g water per 100 g dry mineral at relative humidity from 0.03 to 1. The water can be pumped off under vacuum or by heating in air to 150° C., the dried material remaining stable up to about 300° C.

The tubes can be dispersed by subjecting the material to ultrasonic treatment in an acidic solution of a pH 3 to 5, and can be re-coagulated on adjusting the pH to 7.5 or more, this being the reverse of usual behaviour in clays.

On the basis of electron diffraction pattern, composition and the proven presence of orthosilicate anions, it has been proposed that the walls of the tubes have a structure like that of a single sheet of gibbsite (Al(OH)$_3$) with orthosilicate groups replacing the inner hydroxyl surface of the gibbsite tube. This gives an empirical formula (HO)$_3$Al$_2$O$_3$SiOH, which is also the sequence of atoms encountered on passing from the outer to the inner surface of the tubular model. Natural samples have compositions in the range

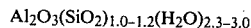

$$Al_2O_3(SiO_2)_{1.0-1.2}(H_2O)_{2.3-3.0}$$

Therefore this invention consists of a method of synthesising an inorganic material which is a fibrous product having tubular structure related to, or resembling, the natural product imogolite, (for example being 13–17% larger in tube diameter), the method being as follows: Prepare an aqueous hydroxyaluminium silicate solution containing up to 0.5 molar aluminium; the solution must have a pH of 3.1 to 5.0, preferably 3.5 to 4.6; the solution is prepared by hydrolysis in acid of aluminium alkoxide and, introduced not earlier than the aluminium alkoxide, tetraalkyl silicate; digest the solution thus prepared until a product is obtained displaying discernible electron diffraction peaks at 1.4 Å, 2.1 Å and 4.2 Å. The atomic proportion of Si:Al is not critical in solutions containing low (e.g. 2 mM) concentrations of silicon, but should not exceed 0.6:1, more preferably should not exceed 0.5:1, in solutions containing high (over 20 mM, e.g. 40 mM) concentrations of silicon.

Preferably, the aluminum alkoxide is mixed with the tetraalkyl silicate before hydrolysing the mixture in acid to give the final pH of 3.1 to 5.0, preferably 3.5 to 4.6. The tetraalkyl silicate may nonetheless be added after hydrolysing the aluminium alkoxide but not before. All this hydrolysis occurs relatively rapidly (minutes/hours) even in the cold, in which state the resulting hydroxyaluminium silicate solution is stable for some time. If the tetraalkyl silicate were added first, it would usually hydrolyse to silica gel, which when brought together with aluminium gives a non-imogolite product.

If the aluminium alkoxide and tetraalkyl silicate are mixed together before the hydrolysis, the mixture should not be left to stand too long before the hydrolysis (in the case of aluminium sec-butoxide and tetraethyl silicate) since immiscible and acid-hydrolysis-resistant oils slowly form, comprising diethyldibutyl-silicate and monoethyl-tributyl-silicate.

The pH of the solution is determined by the strength of the acid used in the hydrolysis. This acid may be a non-complexing e.g. mineral (not sulphuric) acid, e.g. nitric or hydrochloric acid, preferably perchloric acid, which may include acetic acid and which may be present in an amount up to 10 millimolar more than the aluminium, preferably from 1 millimolar more than one-sixth of the aluminium (by mole) to 5 millimolar more than the aluminium. Chloride ion, if present, preferably does not exceed 25 millimolar. The atomic ratio Si:Al is preferably at least 0.1:1. The initial aluminium alkoxide concentration may be up to 300 millimolar and preferably is from 10 to 150 mM. Solutions of higher concentration of synthetic imogolite are preferably obtained by stepwise addition of concentrated hydroxyaluminium silicate solution (e.g. up to 40 mM Al) during the digestion to keep the concentration of reactive precursors near the optimum for high gel yield and rapid formation. One could add, for example, 40 mM Al lots of hydroxyaluminium silicate at daily intervals, or 20 mM lots 6-hourly, or preferably 20 mM lots daily (giving a total concentration of 65 mM Al in 4 days).

The solution is preferably held at 40° C. to 170° C., more preferably 90° C. to 130° C., conveniently 95° C. to 100° C., at least until the yield of product reaches a maximum (typically taking 1 to 60 days). Exemplary durations are 20 days at 60° C. and 1–4 days at 100° C. The temperature range is not mandatory, but at excessive temperatures in the wet, imogolite decomposes to boehmite or kaolinite and boehmite, while at lower temperatures the reaction times become prolonged. The presence of anions inhibits imogolite formation, chloride more strongly than nitrate more strongly than perchlorate. Formation of synthetic imogolite at pH 4. to 5.0 is erratic and depends on the exact history of the solutions. Therefore the preferred pH for the digestion is not more than 4.6, and this digestion pH may be obtained by hydrolysis of the alkoxide and silicate in the acid. Further, since the solution tends to become more acidic during digestion, the preferred starting pH is not less than 3.5.

The product may be isolated from its colloidal solution, preferably by drying, for example spray-drying, or by freeze-drying after precipitating a gel with alkali or added salt (e.g. chloride, when the precipitation is believed to be reversible; or phosphate, believed irreversible) and centrifuging (which may be repeated after washing and mechanical agitation of the gel), or alternatively by foam-flotation using an anionic detergent. In this isolated form, it may find application as a support medium in electrophoresis, molecular sieve, catalyst support, catalyst, coagulant (i.e. gel-former) or sorbent. Synthetic imogolite may incorporate other ions replacing Al or Si by isomorphous substitution (e.g. Cr(III) or Fe(III), or Ge or Ti respectively) and may be activated for catalysis by heating or exposing to hydrogen.

Coherent films can be formed by evaporating imogolite colloidal solutions on to a flat surface; such films may find application as membranes. Fibres may be obtained by spinning from solutions containing long-chain organic polymers. On ignition, these should yield a refractory inorganic oxide fibre.

Instead of this isolation, the solution held for a while at 60° C. to 140° C. may be made alkaline, for example with ammonia. A gel results, which may find application in its own right.

The product need not be isolated from its colloidal solution. Instead, for example, it may be used as a flocculant, a hydrophilizer or a thickener.

The invention extends to the product of this method, optionally isolated as set forth above.

The invention also extends to a gel comprising synthetic imogolite made as set forth above, including a gel with a solids concentration of under 1% by weight e.g. under 0.5% e.g. 0.1%.

The invention will now be described by way of example.

The accompanying FIGURE shows the performance of Examples 1 to 8.

EXAMPLES 1 TO 8

15 millimoles of aluminium sec-butoxide $Al(OC_4H_9)_3$ was mixed with 7.5 millimoles tetraethyl silicate $Si(OC_2H_5)_4$, and the liquid mixture poured into 100 ml of 75 millimolar perchloric acid $HClO_4$, with vigorous stirring. Stirring was continued for 21 hours, when the initial opalescence had substantially cleared. A small amount of solids was removed by centrifuging, and the clear supernatant containing the reactive aluminium silicate complex was diluted to the extents shown below to give a stock solution, which was heated at 96° C. and gave the gel volumes indicated below after the periods indicated below. The gel volumes were measured as milliliters of gel formed on adding ammonia to a batch of the heated stock solution; each batch was diluted to a standard 2.5 mM Al and a standard 10 ml thereof was treated with the ammonia in each case. The atomic ratio Si:Al was, of course, 0.5:1 in each case.

| Example No. | mM Al | mM Si | Gel volumes | | pH | |
|---|---|---|---|---|---|---|
| | | | 1 day | 4 days | initial | final |
| 1 | 10 | 5 | 2.3 | 2.3 | 4.4 | 2.8 |
| 2 | 20 | 10 | 2.6 | 2.6 | 4.3 | 2.9 |
| 3 | 40 | 20 | 3.2 | 3.5 | 4.2 | 3.0 |
| 4 | 60 | 30 | 2.4 | 4.7 | 4.1 | 3.4 |
| 5 | 80 | 40 | 2.4 | 3.9 | 4.1 | 3.5 |
| 6 | 100 | 50 | 1.3 | 3.6 | 4.0 | 3.6 |
| 7 | 120 | 60 | 1.3 | 2.9 | 4.0 | 3.5 |
| 8 | 140 | 70 | 0.6 | 2.0 | 3.9 | 3.7 |

The gel volumes are shown on the accompanying FIGURE for each of Examples 1 to 8, both for 1 day and 4 days. Also, comparative examples are shown in dashed lines, wherein, instead of sec-butoxide, chloride and perchlorate were used.

EXAMPLES 9 TO 16

These Examples show the effect of varying the proportion of perchloric acid $HClO_4$ during the hydrolysis of aluminium sec-butoxide and silicon tetraethoxide (=tetraethyl silicate $Si(OC_2H_5)_4$).

The same procedure was followed as in the first sentence of Examples 1 to 9, except that the amount of $HClO_4$ was varied to give stock solutions containing 150 mM Al, 75 mM Si, and from 30 to 375 mM $HClO_4$. Stirring was continued for 21 hours. A substantial precipitate remained at 30 mM $HClO_4$, and a slight precipitate at 75 mM $HClO_4$; these were removed by centrifuging. The formation of imogolite was followed at 96° C. in undiluted (150 mM Al) and diluted (10 mM Al) solutions. As will be seen, imogolite formed in solutions containing up to 20 mM $HClO_4$ in the 10 mM Al solutions, and up to just over 150 mM $HClO_4$ in the 150 mM Al solutions, in other words in solutions containing perchloric acid in amounts up to 10 mM more than the aluminium. The 'nominal concentrations' below ignore losses by precipitation as referred to above. The gel volumes are reported in the same way as for Examples 1 to 8.

| Example No. | Nominal Concentrations (mM) | | | pH | | Gel Volume | |
|---|---|---|---|---|---|---|---|
| | Al | Si | $HClO_4$ | initial | Final | 1 day | 6 days |
| 9 | 150 | 75 | 30 | 3.7 | 3.3 | 0.5 | 1.0 |
| 10 | 150 | 75 | 75 | 3.5 | 3.5 | 0.4 | 1.4 |
| 11 | 150 | 75 | 150 | 3.2 | 3.4 | 0.4 | 0.4 |
| Comparative | 150 | 75 | 225–375 | 3.0–2.8 | 3.3–2.9 | 0 | 0 |
| 12 | 10 | 5 | 2 | 4.7 | 3.5 | 0.4 | 0.4 |
| 13 | 10 | 5 | 5 | 4.4 | 3.2 | 2.9 | 3.3 |
| 14 | 10 | 5 | 10 | 4.1 | 2.9 | 2.6 | 3.6 |
| 15 | 10 | 5 | 15 | 3.9 | 3.9 | 1.4 | 2.3 |
| 16 | 10 | 5 | 20 | 3.8 | 3.1 | 0.4 | 0.8 |
| Comparative | 10 | 5 | 25 | 3.7 | 3.1 | 0 | 0 |

EXAMPLES 17 TO 26

These Examples demonstrate the effect of varying the Si:Al ratio on a procedure permitting hydrolysis of aluminium butoxide before addition of tetraethyl silicate.

11.65 g of 95% Al sec-butoxide (45 millimoles) was vigorously stirred for 8 hours with 22.5 ml molar $HClO_4$ plus 267 ml water to give a final volume of 300 ml, of composition 150 mM Al; 75 mM $HClO_4$. This was diluted to 100 mM Al and subdivided into seven samples, to which the amounts shown below of tetraethyl silicate were added to give solutions with Si:Al atomic ratios of from 0 to 0.7:1. Vigorous shaking was continued overnight; the sample of Si:Al=0.7:1 had then to be discarded as it had gelled. Formation of imogolite at 96° C. in the remaining samples was checked at 100 mM Al and 10 mM Al. The results indicated that the optimum gel volumes are obtained at Si:Al atomic ratios of 0.4–0.5:1 under these conditions. A ratio of more than 0.6 should be avoided. Gel volumes are reported in the same way as for Examples 1 to 8.

| Example No. | Concentrations (mM) | | | pH | | Gel depth (2.5mM) | |
|---|---|---|---|---|---|---|---|
| | Al | Si | $HClO_4$ | orig | final | 1 day | 4 days |
| 17 | 10 | 6 | 5 | 4.3 | 3.3 | 1.0 | 2.7 |
| 18 | 10 | 5 | 5 | 4.3 | 3.2 | 1.8 | 2.4 |
| 19 | 10 | 4 | 5 | 4.3 | 3.1 | 2.0 | 2.2 |
| 20 | 10 | 3 | 5 | 4.4 | 3.0 | 1.4 | 1.5 |
| 21 | 10 | 1.5 | 5 | 4.6 | 3.0 | 1.2 | 1.2 |
| Comparative | 10 | 0 | 5 | 4.8 | 2.9 | 0 | 0.3* |
| 22 | 100 | 60 | 50 | 3.8 | 3.7 | 0.5 | 0.5 |
| 23 | 100 | 50 | 50 | 3.9 | 3.6 | 0.5 | 1.2 |
| 24 | 100 | 40 | 50 | 4.0 | 3.6 | 1.3 | 2.0 |
| 25 | 100 | 30 | 50 | 4.1 | 3.4 | 1.5 | 1.5+ |
| 26 | 100 | 15 | 50 | 4.3 | 3.1 | 1.3 | 1.5+ |

-continued

| Example No. | Concentrations (mM) | | | pH | | Gel depth (2.5mM) | |
|---|---|---|---|---|---|---|---|
| | Al | Si | HClO$_4$ | orig | final | 1 day | 4 days |
| Comparative | 100 | 0 | 50 | 4.5 | 2.4 | 0 | 0+ |

*identified as gibbsite
+opalescent solutions

EXAMPLES 27 TO 34

As will be seen from Examples 1 to 8, the gel-forming characteristics of starting solutions vary, especially at high reagent concentrations. The following Examples lead to a similar conclusion.

16.8 cm$^3$ Si(OEt)$_4$ (75 mmol) were added to 38.8 g 95% Al s-butoxide (150 mmol), throughly mixed, then poured into 950 cm$^3$ water containing 75 cm$^3$ 1 M HClO$_4$ with vigorous stirring, continued for 3 hours until the initial gelatinous precipitate was completely dispersed. Gentle stirring was then continued for a further 18 hours to give a slightly opalsecent stock solution of pH 3.4 after centrifuging.

This stock solution, after dilution and heating to 96° C. gave the following yields (cm$^3$ gel from 10 cm$^3$ solution):

| Example No. | mM Al | mM Si | Gel volumes (2.5mM mM Al) | | | pH | |
|---|---|---|---|---|---|---|---|
| | | | 1 day | 2 days | 4 days | initial | final |
| 27 | 10 | 5 | 2.7 | 2.8 | 3.3 | 3.8 | 2.8 |
| 28 | 20 | 10 | 2.6 | 3.0 | 3.3 | 3.8 | 2.8 |
| 29 | 40 | 20 | 1.8 | 2.4 | 2.8 | 3.7 | 3.2 |
| 30 | 60 | 30 | 1.0 | 1.8 | 2.4 | 3.6 | 3.4 |
| 31 | 80 | 40 | 0.5 | 1.4 | 2.0 | 3.6 | 3.4 |
| 32 | 100 | 50 | 0.4 | 1.1 | 1.7 | 3.5 | 3.5 |
| 33 | 120 | 60 | 0.4 | 0.8 | 1.4 | 3.5 | 3.5 |
| 34 | 140 | 70 | 0.4 | 0.7 | 1.3 | 3.5 | 3.5 |

EXAMPLE 35

Since the best gel yields are obtained at lower reagent concentrations (see Examples 27 to 34), a procedure was used in which the concentration of imogolite was built up in increments, each addition of the concentrated stock solution being converted to synthetic imogolite under reflux before more reagent was added. Initially (day 0), 159 ml of stock solution was diluted to give 1195 ml containing 20 mmol/liter of Al. Subsequent additions were made at 1 day intervals, and the gel volumes monitored as below:

| Day | mmol Al/liter | Gel Volume | | Stock solution increment ml |
|---|---|---|---|---|
| | | 2.5mM Al | 1mM Al | |
| 1 | 20 | 2.7 | 1.7 | 184 |
| 2 | 37 | 3.8 | 2.8 | 212 |
| 3 | 52 | 4.1 | 2.3 | 245 |
| 4 | 65 | 3.6 | 2.0 | |
| 7 | 65 | 6.9 | 2.4 | |

This procedure gives a better gel yield at 65 mM Al concentration than does a single step procedure after 7 days.

EXAMPLES 36 TO 39

In Examples 36 to 39, we explore the replacement of HClO$_4$ by other acids.

Stock solutions were prepared as described under Examples 27 to 34, containing 150 mM Al, 75 mM Si but with different acids: either (Example 36) 75 mM HClO$_4$ or (Example 37) 75 mM HNO$_3$ or (Example 38) 75 mM HCl or (Example 39) 30 mM HClO$_4$ plus 75 mM acetic acid (HAc). (Use of acetic acid alone left a substantial precipitate after hydrolysis of the mixed alkoxides). The development of gel on heating these stock solutions, after dilution, at 96° C. was compared.

| Acid, Example No. | mM Al | Gel volumes (2.5mM) | | | | pH | |
|---|---|---|---|---|---|---|---|
| | | day 1 | day 2 | day 4 | day 9 | Initial | Final |
| HClO$_4$ 36 | 10 | 3.2 | 3.2 | 3.2 | 3.2 | 4.3 | 2.9 |
| | 40 | 0.5 | 1.2 | 2.2 | 2.9 | 4.1 | 3.4 |
| | 80 | 0.3 | 0.4 | 0.8 | 1.4 | 3.8 | 3.5 |
| HNO$_3$ 37 | 10 | 2.4 | 2.9 | 2.9 | 2.9 | 4.4 | 3.2 |
| | 40 | 0.3 | 0.6 | 1.2 | 1.7 | 4.1 | 3.7 |
| | 80 | 0.3 | 0.3 | 0.3 | 0.5 | 3.8 | 3.7 |
| HCl 38 | 10 | 1.6 | 2.2 | 2.7 | 2.7 | 4.4 | 3.3 |
| | 40 | 0.3 | 0.3 | 0.5 | 0.6 | 4.1 | 3.8 |
| | 80 | 0.3 | 0.3 | 0.4 | 0.3 | 3.8 | 3.7 |
| HAc + HClO$_4$ 39 | 10 | 2.3 | 3.5 | 3.3 | 3.0 | 4.6 | 3.4 |
| | 40 | 0.5 | 1.4 | 2.4 | 2.7 | 4.4 | 3.5 |
| | 80 | 0 | 0.4 | 1.2 | 2.1 | 4.3 | 3.6 |

Gel yield decreased in the order HClO$_4$>HNO$_3$>HCl especially at higher concentrations of reagents. Mixed acetic and perchloric acids gave as good or better yields than HClO$_4$ alone, but the gels developed more slowly.

I claim:

1. A method of synthesising an inorganic material which is a fibrous product having tubular structure related to, or resembling, the natural product imogolite, the method comprising:

preparing an aqueous hydroxyaluminum silicate solution containing up to 0.5 molar aluminum, wherein the atomic proportion of Si:Al in the solution does not exceed 0.6:1 when the solution contains a concentration of silicon over 20 mM, the solution having a pH of 3.1 to 5.0 and having been prepared by hydrolysis in acid of aluminum alkoxide and, introduced not later than the aluminum alkoxide, tetra-alkyl silicate; and digesting the solution thus prepared until a product is obtained displaying discernible electron diffraction peaks at 1.4 Å, 2.1 Å and 4.2 Å.

2. A method according to claim 1, wherein the prepared solution has a pH of 3.5 to 4.6.

3. A method according to claim 1, wherein the atomic proportion of Si:Al in the solution does not exceed 0.5:1 and wherein the solution contains over 20 mM Si.

4. A method according to claim 1, wherein the aluminium alkoxide is mixed with the tetraalkyl silicate before the mixture is hydrolysed with acid to produce the aqueous hydroxyaluminium silicate solution of pH 3.0 to 5.0.

5. A method according to claim 1, wherein the acid used for the hydrolysis is a non-complexing acid.

6. A method according to claim 5, wherein the acid is a mineral acid, excluding sulphuric acid.

7. A method according to claim 6, wherein the acid is any one of perchloric acid, nitric acid and hydrochloric acid.

8. A method according to claim 7, wherein the acid comprises a mixture of perchloric acid and acetic acid.

9. A method according to claim 7, wherein the perchloric acid is present in a concentration of at least (one sixth of the aluminium plus 1) millimolar and at most (the aluminium plus 5)millimolar.

10. A method according to claim 1, wherein chloride ion if present has a concentration not exceeding 25 millimolar.

11. A method according to claim 1, wherein the atomic proportion of Si:Al in the solution is at least 0.1:1.

12. A method according to claim 1, wherein, during the digestion, additional hydroxyaluminum silicate solution containing up to 40 millimolar aluminum is added in stages on a daily basis until the hydroxyaluminum silicate reaches a concentration of at least 60 millimolar in aluminum.

13. A method according to claim 1, wherein the digestion is performed at 40° C. to 170° C.

14. A method according to claim 13, wherein the digestion is performed at 90° C. to 130° C.

15. A method according to claim 14, wherein the digestion is performed at 95° C. to 100° C.

16. A method according to claim 1, wherein the digestion is performed at a pH of not more than 4.6 throughout.

17. A method according to claim 16, wherein the pH when the digestion starts is not less than 3.5.

18. A method according to claim 1, wherein, after digestion, the resulting colloidal solution is dried to recover the inorganic material.

19. A method according to claim 1, wherein, after digestion, a gel is precipitated from the resulting colloidal solution by the addition of alkali or salt and then freeze-dried and centrifuged to recover the inorganic material.

20. A method according to claim 1, wherein, after digestion, the resulting colloidal solution is subjected to foam-flotation using an anionic detergent to recover the inorganic material.

21. A method according to claim 1, wherein, after digestion, the resulting colloidal solution is evaporated on a flat surface to recover the inorganic material as a coherent film.

* * * * *

UNITED STATES PATENT AND TRADEMARK OFFICE
CERTIFICATE OF CORRECTION

PATENT NO. : 4,241,035
DATED : December 23, 1980
INVENTOR(S) : Victor Colin Farmer It is certified that error appears in the above—identified patent and that said Letters Patent is hereby corrected as shown below:

In column 6 (Claim 1), line 44, "not later" should read --not earlier--.

Signed and Sealed this

Second Day of February 1982

[SEAL]

Attest:

Attesting Officer

GERALD J. MOSSINGHOFF

Commissioner of Patents and Trademarks